United States Patent
Don et al.

(10) Patent No.: US 6,574,703 B1
(45) Date of Patent: Jun. 3, 2003

(54) INITIALIZING SELECTED EXTENTS OF A STORAGE DEVICE

(75) Inventors: Arieh Don, Newton, MA (US); Haim Kopylovitz, Brookline, MA (US); Aviram Cohen, Lexington, MA (US); Hana Moreshet, Framingham, MA (US); Alexandr Veprinsky, Brookline, MA (US); Philip E. Tamer, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/056,401

(22) Filed: Jan. 24, 2002

Related U.S. Application Data

(63) Continuation-in-part of application No. 10/034,286, filed on Dec. 28, 2001.

(51) Int. Cl.[7] .............................................. G06F 12/00
(52) U.S. Cl. ........................ 711/112; 711/159; 711/163; 711/156; 369/13.03; 369/53.21
(58) Field of Search .......................... 711/112, 111, 154, 711/156, 159, 163; 369/13.03, 53.21, 53.37, 83, 84

(56) References Cited

U.S. PATENT DOCUMENTS 3,771,143 A * 11/1973 Taylor .......................... 360/25
5,809,542 A * 9/1998 Tsuboi et al. ................ 711/112

* cited by examiner

Primary Examiner—Matthew Kim
Assistant Examiner—Matthen D. Anderson
(74) Attorney, Agent, or Firm—Fish & Richardson P.C.

(57) ABSTRACT

A system and method for initializing large portions, or extents, of a mass-storage device in the background so that such overwriting processes do not significantly affect latency as experienced by a host. The method extends the use a system intended for background copying of data from a source extent to a destination extent to that of initializing an extent on a mass-storage device. It does so by causing the system to treat the defined extent as both a source extent and as a destination extent simultaneously.

14 Claims, 4 Drawing Sheets

INITIALIZING SELECTED EXTENTS OF A STORAGE DEVICE

RELATED APPLICATIONS

This application is a continuation of copending U.S. patent aplication Ser. No. 10/034,286, filed Dec. 28, 2001, entitled "INITIALIZING SELECTED EXTENTS OF A STORAGE DEVICE", the contents of which are herein incorporated by reference.

FIELD OF INVENTION

This invention relates to data storage systems, and in particular, to initializing selected extents of a mass-storage device.

BACKGROUND

A data storage system typically includes a large number of mass-storage devices, usually disks, for storage of data. Each device includes a contiguous sequence of blocks and tracks, sometimes referred to as an "extent," that carries information identifying that device to the data storage system. This extent is said to be holding the label identifying that device to the data storage system. To avoid sowing confusion, it is important that no two devices on the data storage system share the same label.

Although hardware failure occurs only rarely, it is nevertheless desirable to maintain, on a second device, a copy of data stored on a first device. This second device, which is sometimes referred to as a "business continuation volume", is intended to be identical to the first device. This means that the second device has the same label as the first device. To avoid any confusion arising from the presence of two devices having the same label, a device-management utility executing on the data storage system sets a flag indicating that the second device is a mirror of the first device.

At some point, it may no longer be necessary to maintain copies of data from the first device on the second device. When this point is reached, the device management utility breaks the link between the first and second devices. This includes clearing the flag that designates the second device as a mirror. To avoid confusion arising from two devices having the same label, the device management utility also initializes the second device's label so that it is no longer identical to that of the first device. This typically includes overwriting the extent on the second device that includes the label.

In most cases, the label occupies a small enough extent on the device so that the process of overwriting it consumes a negligible amount of time. However, certain software applications, particularly database applications, have labels that occupy very large extents on the storage device. The process of initializing these extents, which can be as large as several megabytes, consumes enough time to introduce a noticeable latency during the process of breaking the link between the first and second devices.

SUMMARY

The invention provides a system and method for initializing large portions, or extents, of a mass-storage device in the background so that such overwriting processes do not significantly affect latency as experienced by a host. The method extends the use a system intended for background copying of data from a source extent to a destination extent to that of initializing an extent on a mass-storage device. It does so by causing the system to treat the defined extent as both a source extent and as a destination extent simultaneously.

In one practice of the invention, initializing an extent having at least one track includes preserving data in the track from being overwritten, indicating that the data in the track is to be replaced, and associating with the track an initialization code indicating the track is to be initialized.

Preserving the data in the track can include modifying a protection word corresponding to the track, for example, by selecting a protection bit in the protection word and modifying the selected protection bit.

Associating an initializing code can include inserting, at a selected location in a session table, the initializing code. In this practice of the invention, preserving data in the track can include selecting a protection bit in a protection word to correspond to the selected location in the session table and modifying that selected protection bit Associating an initialization code with the track can also include providing the initial code at two or more independent locations associated with the track. This provides a basis for cross-checking the initializing code, thereby reducing the possibility of erroneously initializing a track.

In another practice of the invention, a track having data preserved from being overwritten is identified and an association between that track and an initializing code is determined. Following this, the track is then initialized.

Identifying a track having data preserved from being overwritten can include identifying a track having an associated protection word that is modified to indicate that data in the track is preserved from being overwritten.

To reduce the likelihood that tracks will be erroneously initialized, an optional practice of the invention includes confirming that the track has associated with it one, and optionally more than one indicator to indicate that data in the track is to be replaced.

In another practice of the invention, the consummation of the initialization process is triggered by an attempted read/write operation in a track. In the process, information associated with the track is detected. This information indicates that data in that track is to be replaced. An initializing code associated with the track is then identified and the track is then initialized.

The method of the invention is described in the context of initializing a label on a storage device. However, the invention is applicable to initializing any extent on a storage device, regardless of the purpose of the data contained in that extent.

These and other features and advantages of the invention will be apparent from the following detailed description and the accompanying figures, in which:

DETAILED DESCRIPTION

Figure 1:
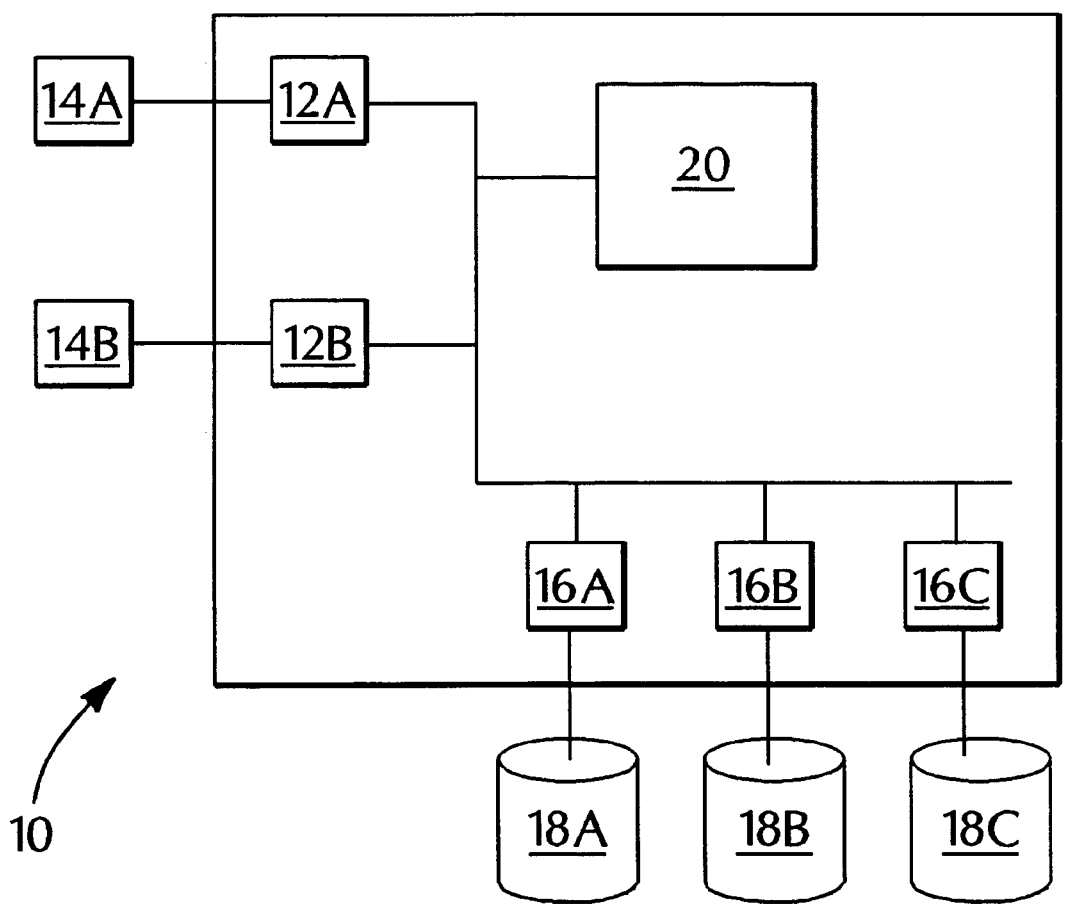
FIG. 1 shows a data-storage system.

A data-storage system 10 for practice of the invention, as shown in FIG. 1, includes one or more host-adaptors 12A, 12B, each of which is in communication with a corresponding host 14A, 14B and with a common global memory 20. A host 14A, 14B is the ultimate user of the data-storage system 10. Typically, the host 14A, 14B is a separate processing system that periodically instructs the data-storage system 10 to either store or retrieve selected data.

The data-storage system 10 also includes one or more device-adaptors 16A–C, each of which is in communication with a corresponding mass-storage device 18A–C and with the global memory 20. In response to requests relayed to the data-storage system 10 by the host-adaptors 12A, 12B, each device-adaptor 16A–C carries out the task of moving selected data between its corresponding mass-storage device 18A–C and the global memory 20.

To ensure the availability of data, certain mass storage devices are configured to be mirror devices. Each mirror device is intended to be an exact copy of a corresponding primary device. As a result, whenever a host 14A, 14B requests that data stored in a primary device be modified, the data-storage system 10 must modify that data on both the primary device and any of its associated mirror devices.

The writing of data to a mass-storage device 18A–C is a notoriously slow process. Because each write to a primary device is accompanied by a write to one or more mirror devices, the coupling of a primary device with a mirror device further exacerbates latencies associated with writing to a mass-storage device 18A–C. In the illustrated data-storage system 10, the device-adaptors 16A–C and the host-adaptors 12A, 12B operate asynchronously to conceal these latencies from the hosts 14A–B. This asynchronous operation is described in U.S. application Ser. No. 09/342,608, filed on Jun. 29, 1999, the contents of which are herein incorporated by reference.

Data Structures

Figure 2:
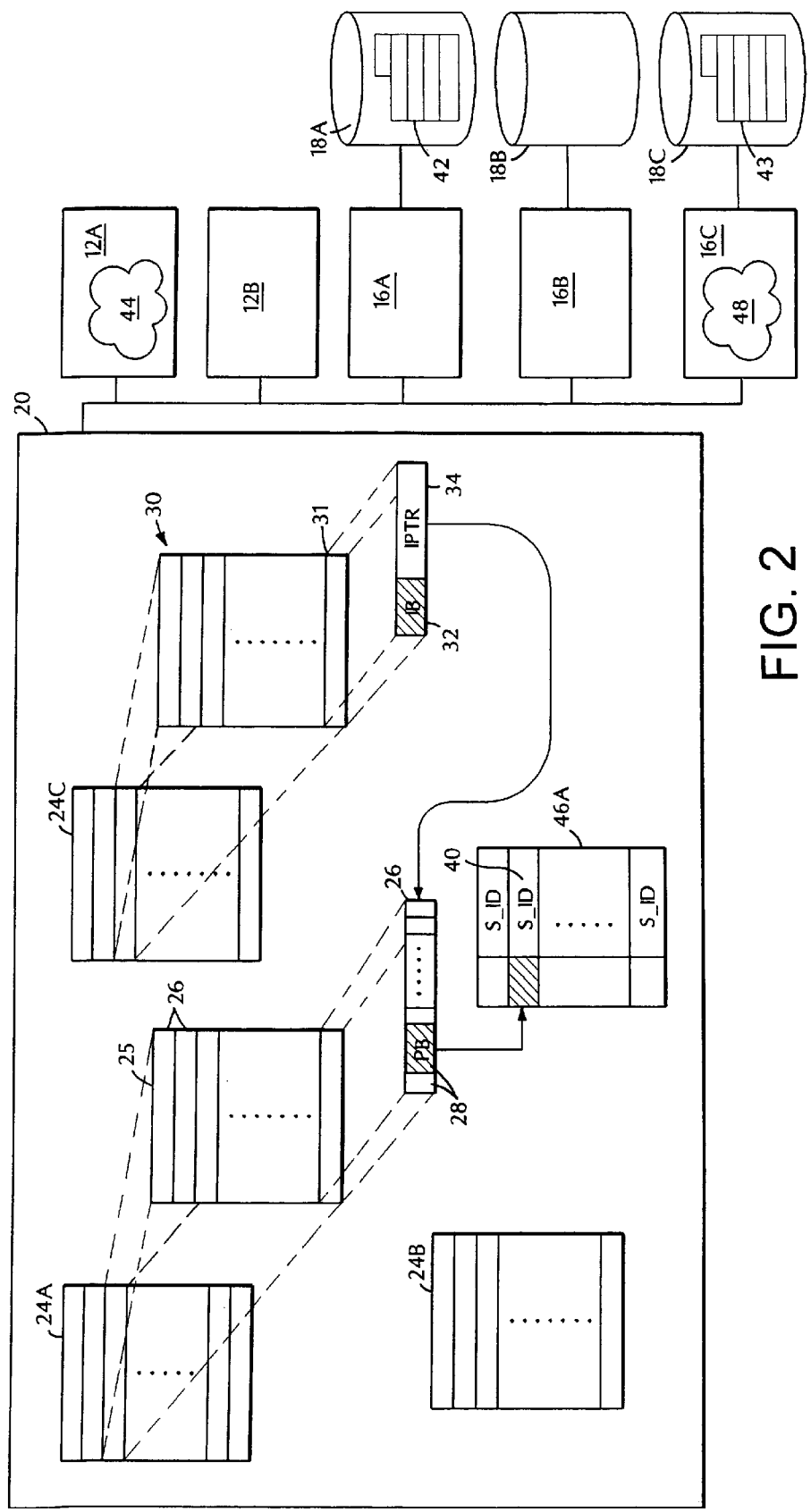
FIGS. 2 and 3 show data structures maintained within the data-storage system of FIG. 1.

As described in the foregoing application, and as shown in FIG. 2, for each device 18A–C, the data-storage system 10 maintains, in the global memory 20, a device header 24A–C containing cylinder headers 25 corresponding to each cylinder on that device 18A–C. A typical cylinder header 25, one of which is shown in exploded view in FIG. 2, includes a two-byte protection word 26 for each track on the cylinder. A protection word 26 for a track is available to indicate that data in that track is to be protected from being overwritten.

Protecting a track from being overwritten is especially important when data on that track has been modified and those modifications are to be copied elsewhere. For example, if a track on a primary device is modified, a corresponding track on all its mirror devices must also be modified. To reduce latency perceived by the host 14A, the system marks the track for subsequent copying and reports the completion of the copy operation to the host, even though the actual copy operation has not even begun. The system then copies the data in that marked track to corresponding tracks on the mirror device in the background. The data in the marked track on the primary device must therefore be preserved while it waits to be copied to each mirror device. It is for this reason that a protection word 26 is provided for each track.

Each protection word 26, one of which is shown in exploded view in FIG. 2, consists of sixteen protection bits 28. Each protection bit 28 is associated with one pending task that requires access to the data in that track. For example, if the data in that track must be copied to three different places, three of the sixteen protection bits are set. As each of the three copy operations is completed, the protection bit associated with that copy operation is cleared. Data in a particular track is protected against being modified for as long as at least one protection bit 28 in that track's associated protection word 26 remains set.

As noted above, a protection bit 28 can only indicate that the data on a track may not be overwritten. It does not, by itself, carry any information about what to actually do with that data. For example, in the context of data that is to be copied to another location, the protection bit 28 cannot identify that location. Information about what to do with that data, i.e. the intended disposition of that data, is stored in a sixteen-entry session table 46A associated with that device 18A.

Each entry in the session table 46A corresponds to one of the sixteen protection bits 28 in the protection words 26 for each source track on the device 18A. The offset of a protection bit 28 within the protection word 26 thus provides an index into the session table 46A. Each entry in that session table 46A includes a session ID 40 that identifies the intended disposition of data contained in a track on that device.

Each set of cylinder headers 24A–C also includes a track table 30, one of which is shown in exploded view in FIG. 2. The track table 30 includes an indirect bit 32 for each track on that device 18C. The indirect bit 32 is used to indicate that the data presently stored in that track is no longer valid. This can occur if, for example, the data stored in that track is intended to be a copy of data stored on another track, and the data on that other track has been modified and is now waiting to be copied.

The indirect bit 32 can only indicate that the data in that track is obsolete and must be replaced. For example, the indirect bit 32 cannot identify the location of the data that is to be copied into its associated track. This information can, however, be included in an indirect pointer 34, also present in the track table 30, that is associated with each track on the device 18C.

Marking Process for Copying

In normal operation, when a host 14A requests that a source extent 42 on a source device 18A be modified, the host-adaptor 12A executes a marking process 44. The host-adaptor provides the marking process 44 with information identifying the location of the source extent 42 and with a session ID 40 that identifies the desired disposition of the data in the source extent 42.

The source extent 42 can include one or more tracks together with one or two residual portions, each of which occupies less than a complete track. These residual portions are copied directly, bypassing the asynchronous copy operation described herein.

The marking process 44 then inspects the session table 46A to determine if there is already a session entry corresponding to its session ID. If there is no such session entry, the marking process 44 creates one. In either case, for each source track in the source extent 42, the marking process 44 sets a protection bit 28 in that source track's associated protection word 26. The particular protection bit 28 set by the marking process 44 is that bit that corresponds to the session ID 40 in the session table 46A. In the illustrated embodiment, the offset of a protection bit 28 in the sixteen-bit protection word 26 identifies an entry in the sixteen-entry session table 46A.

The marking process 44 then sets the indirect bit 32 associated with a corresponding destination track on a destination device 18C. The marking process 44 also sets the in-direct pointer 34 associated with the destination track to identify the source track whose contents will ultimately be copied to it. Finally, the marking process 44 writes, in the indirect pointer 34, the session ID 40 that it placed in the session table 46A.

Once the marking process 44 completes the foregoing operations for each source track in the source extent 42, the host-adaptor 12A reports the completion of the requested write-operation to the host 14A.

In reality, the data-storage system 10 has not even begun the write operation and the accompanying copy operation. It has only committed itself to carrying out these operations at a more convenient time. In effect, the data-storage system 10 has flagged each source track and destination track that will be affected by the proposed write operation. These flags draw attention to a temporary discrepancy between the source and destination tracks and provide information that will later be required to resolve that discrepancy. The copy operations are ultimately consummated by a fulfillment process 48, typically executing on a device adaptor 16A. The fulfillment process 48 consummates the copy operations in response to any one of three triggering events: (1) the fulfillment process 48, which periodically scans the cylinder headers, recognizes the existence of a set protection bit 28; (2) a host 14A–B attempts to write to a source track whose protection word 26 includes at least one set protection bit 28; and (3) a host 14A–B attempts to read from or to write to a destination track having a set indirect bit 32.

Marking Process for Initializing

The purpose of the foregoing mechanism is to unobtrusively copy large amounts of data from a source device 18A to a destination device 18C. The present invention harnesses this mechanism to instead write an arbitrary data pattern to any extent 42 on a device. It does so by designating the source and destination devices to be the same device.

The following discussion is in the context of initializing a label on a destination device following the splitting of that destination device from its corresponding source device. However, the method described below is applicable to initializing any extent on a storage device. The method does not depend on the particular purpose of the data in that extent. In the discussion below, the data in the extent serves as a label. However, the data in the extent can also serve some other function.

Figure 3:
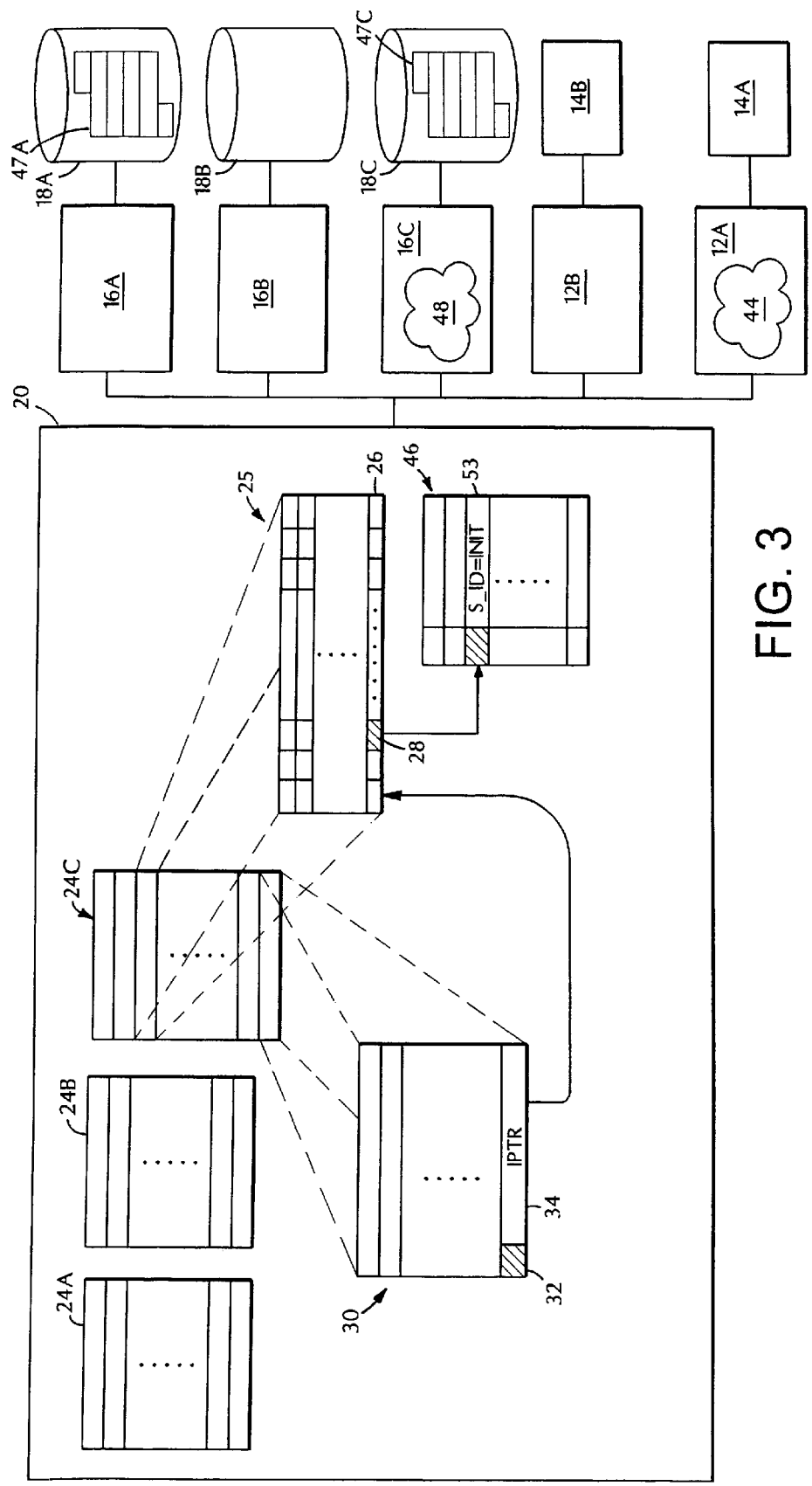

Referring now to FIG. 3, a destination device 18C that mirrors a source device 18A includes a destination label-extent 47C that is identical to a source label-extent 47A on a source device 18A. When the destination device 18C is to be split from the source device 18A, this destination label-extent 47C must be obliterated so as to avoid having two otherwise unrelated volumes have the same label following the split. Typically, obliteration includes writing over the destination label-extent 47C with a selected pattern. In the case of very large labels, such as those that have become increasingly common in database applications, the obliteration process requires considerable disk access and can therefore become excessively time-consuming.

Figures 4, 5, 6:
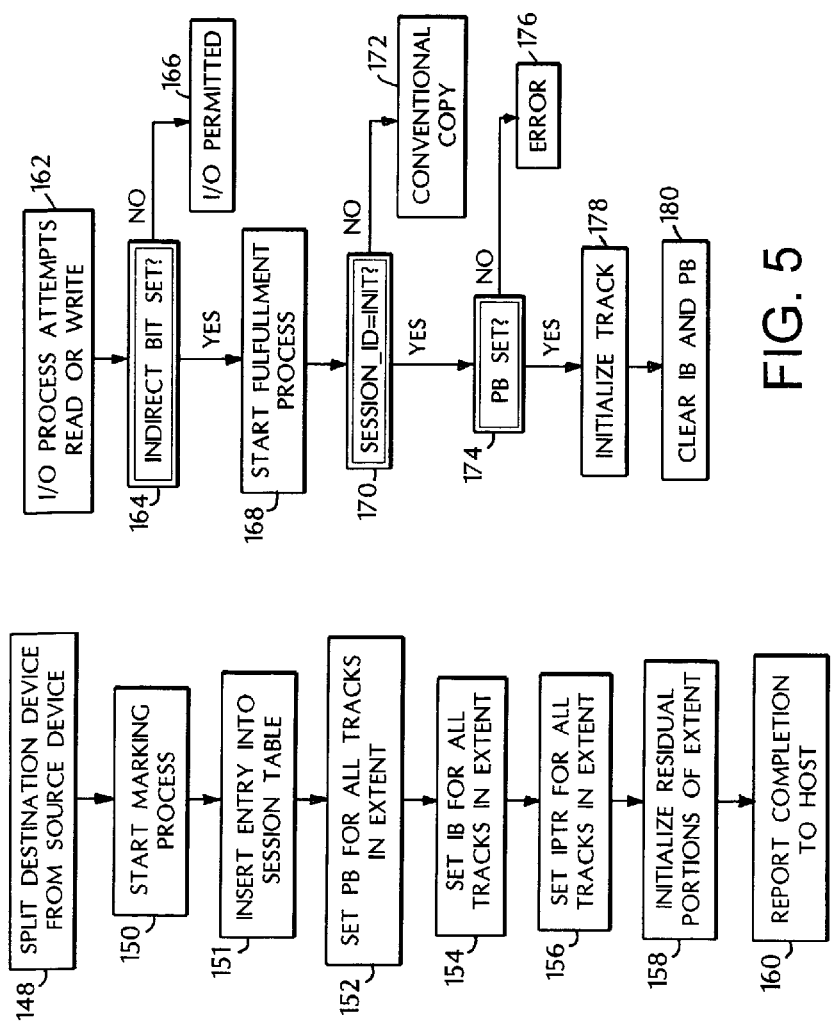
FIG. 4 is a flow-chart of a marking algorithm executed by a marking process.
FIGS. 5 and 6 are flow-charts of overwriting algorithms executed by a fulfillment process.

Referring now to FIG. 4, in response to receiving a command to split a destination device 18C form its source device 18A (step 148), a host adaptor starts a marking process 44 and provides that marking process 44 with the extent containing the label to be initialized and with a particular session ID (step 150). The particular session ID, hereafter referred to as the "initializing session ID," indicates that the data in that extent is to be overwritten. The marking process 44 then inserts an entry in the session table 46A (step 151). This entry includes the initializing session ID as its session ID.

In other applications, in which the extent contains data other than a label of a destination device, the host adaptor starts the marking process 44 in response to receiving an instruction to initialize that extent. It is not necessary in such a case for the host adaptor to receive an instruction to split a destination device from its source device. The remainder of the procedure, as described below, is identical in either case and does not depend on the nature of the data contained in the extent.

For each complete label track in that label extent 43, the marking process 44 sets a protection bit 28 corresponding to that label track (step 152). The offset of the protection bit 28 is selected to identify the entry in a session table 46A that contains the initializing session ID 53, as shown in FIG. 3. The fulfillment process 48 will later recognize this initializing session ID 53 as an instruction to overwrite the corresponding label track with a selected data pattern.

The marking process 44 then sets the indirect bit 32 in the track table 30 of the same label track whose protection bit 28 it has just set (step 154). Because its protection word 26 includes a set protection bit 28, the label track is a source track. However, because the label track's indirect bit 32 is set, it is also a destination track. Thus, the label track manages to be both a source track and a destination track at the same time.

The marking process 44 then sets the indirect pointer 34 associated with that indirect bit 32 to include the initializing session ID and the data pattern that is to overwrite the label track (step 156). Alternatively, the indirect pointer 34 indexes a table of data patterns. In yet another alternative, the data pattern is hard-wired and the indirect pointer 34 need not be used at all. For example, the fulfillment process 48 that will eventually carry out the overwriting of the label track can be configured to clear or set every bit in the label track or to write a particular pattern of bits in the label track.

A label extent, or an extent generally, need not extend over an integral number of tracks. In certain cases, an extent to be initialized can include a number of contiguous tracks preceded and followed by residuary portions, each of which is smaller than a complete track. Because the smallest unit of data that can be marked by the marking process 44 is a complete track, and because these residuary portions are relatively small, the marking process 44 overwrites these residuary portions directly (step 158).

Once the marking process 44 has completed the foregoing steps, it reports the completion of the overwrite task to the host 14A (step 160). The setting of these bits in memory is much faster than the process of overwriting the tracks in the actual device. Accordingly, the latency associated with the overwriting task is not apparent to the host 14A.

Fulfillment Process

Referring now to FIGS. 3 and 5, the operation of the fulfillment process 48 depends on the triggering event. There are essentially two kinds of triggering events: one in which a set protection bit 28 is detected and another in which a set indirect bit 32 is detected.

In the latter case, an I/O process attempts to either read data from a track or write data to a track (step 162). While doing so, the I/O process inspects the indirect bit 32 in that track (step 164). If the indirect bit 32 is clear, the I/O process is carried out in the conventional way (step 166). If the indirect bit 32 is set, the I/O process starts a fulfillment process 48 (step 168).

The fulfillment process 48 next inspects the session ID in that track's indirect pointer (step 170). If the session ID is other than the initializing session ID, the fulfillment process 48 carries out the conventional copying task as described in U.S. application Ser. No. 09/342,608 (step 172).

The fulfillment process 48 next confirms that the protection bit 28 associated with that track is set (step 174). If the protection bit 28 is cleared, the fulfillment process 48 posts an error (step 176). Otherwise, the fulfillment process 48 overwrites the track with the appropriate pattern (step 178).

Once this overwrite operation is complete, the fulfillment process 48 clears both the track's protection bit 28 and its indirect bit 32 (step 180).

Referring now to FIGS. 3 and 6, the fulfillment process 48 periodically scans (step 182) cylinder headers to determine whether any of the tracks in that cylinder contain protection words 26 having at least one set protection bit 28 (step 184). If the fulfillment process 48 does not identify such a track, it continues to scan additional cylinder headers (step 182).

If the fulfillment process 48 identifies such a track, it next inspects the session ID from the entry in the session table 46A that corresponds to the set protection bit 28 (step 186). If the session ID in the session table 46A is other than the initializing session ID, the fulfillment process 48 carries out the conventional copying task as described in U.S. application Ser. No. 09/342,608 (step 188).

If the session ID is the initializing session ID, then the fulfillment process 48 inspects: the indirect bit 32 to confirm that it is set; and the indirect pointer to confirm that the indirect pointer holds the same initializing session ID (step 190). If either the indirect bit 32 is clear or the indirect pointer does not contain the same initializing session ID, the fulfillment process 48 posts an error (step 192). Otherwise, the fulfillment process 48 overwrites the track with the appropriate pattern (step 194).

Once this overwrite operation is complete, the fulfillment process 48 clears both the label track's protection bit 28 and its indirect bit 32 (step 196).

Modern database applications typically create very large volume labels, on the order of a few megabytes, that are time-consuming to overwrite. The foregoing description is written in the context of overwriting a volume label only because this has proven to be one common application of the inventive concept described herein. However, the invention does not depend on whether or not the extent to be overwritten is a volume label. The method and system described herein is applicable to the overwriting of any extent on a device regardless of the significance of whatever data that extent holds. The scope of the invention is thus not limited by the particular application described herein but is instead limited only by the scope of the appended claims.

Having described the invention, and a preferred embodiment thereof, what we claim as new, and secured by letters patent is:

1. A method for initializing an extent having at least one track, said method comprising:
 indicating that data in said track is to be preserved from being overwritten and that said data is to be replaced; and
 associating, with said track, an initialization code indicating said track is to be initialized.

2. The method of claim 1, further comprising initializing a residual portion of said extent.

3. The method of claim 1, wherein preserving said data in said track comprises modifying a protection word corresponding to said track.

4. The method of claim 1, wherein preserving said data in said track comprises selecting a protection bit in a protection word having a plurality of protection bits; and
 modifying said selected protection bit.

5. The method of claim 1, wherein indicating that data in said track is to be replaced comprises modifying an indirect bit associated with said track.

6. The method of claim 5, further comprising including, in an indirect pointer associated with said track, an initialization code indicating said track is to be initialized.

7. The method of claim 1, wherein associating an initializing code comprises including, at a selected location in a session table, said initializing code.

8. The method of claim 7, wherein preserving said data in said track comprises:
 selecting a protection bit in a protection word having a plurality of protection bits, said protection bit being selected to correspond to said selected location in said session table; and
 modifying said selected protection bit.

9. The method of claim 1, wherein associating with said track an initialization code indicating said track is to be initialized comprises including said initialization code at two independent locations associated with said track.

10. A method for initializing an extent having at least one track, said method comprising:
 identifying a track having
  first associated information indicating that data contained in said track is preserved from being overwritten, and
  second associated information indicating that data contained in said track is to be replaced;
 determining that said track is associated with an initializing code; and
 initializing said track.

11. The method of claim 10, wherein identifying a track comprises executing a background process to scan information associated with each track.

12. The method of claim 10, wherein identifying a track comprises attempting an I/O operation on said track.

13. A computer-readable medium having encoded thereon software for initializing an extent having at least one track, said software comprising instructions for:
 preserving data in said track from being overwritten;
 indicating that said data in said track is to be replaced;
 associating with said track an initialization code indicating said track is to be initialized;
 identifying a track having
  first associated information indicating that data contained in said track is preserved from being overwritten, and
  second associated information indicating that data contained in said track is to be replaced;
 determining that said track is associated with an initializing code; and
 initializing said track.

14. A method for initializing an extent having at least one track, said method comprising:
 preserving data in said track from being overwritten;
 indicating that said data in said track is to be replaced;
 associating, with said track, an initialization code indicating said track is to be initialized; and
 initializing said track.

* * * * *

UNITED STATES PATENT AND TRADEMARK OFFICE
CERTIFICATE OF CORRECTION

PATENT NO. : 6,574,703 B1
DATED : June 3, 2003
INVENTOR(S) : Aviram Cohen et al.

It is certified that error appears in the above-identified patent and that said Letters Patent is hereby corrected as shown below:

<u>Title page,</u>
Item [63], remove "Continuation-in-part" and replace with -- Continuation --.

Signed and Sealed this

Second Day of September, 2003

JAMES E. ROGAN
*Director of the United States Patent and Trademark Office*